UNITED STATES PATENT OFFICE.

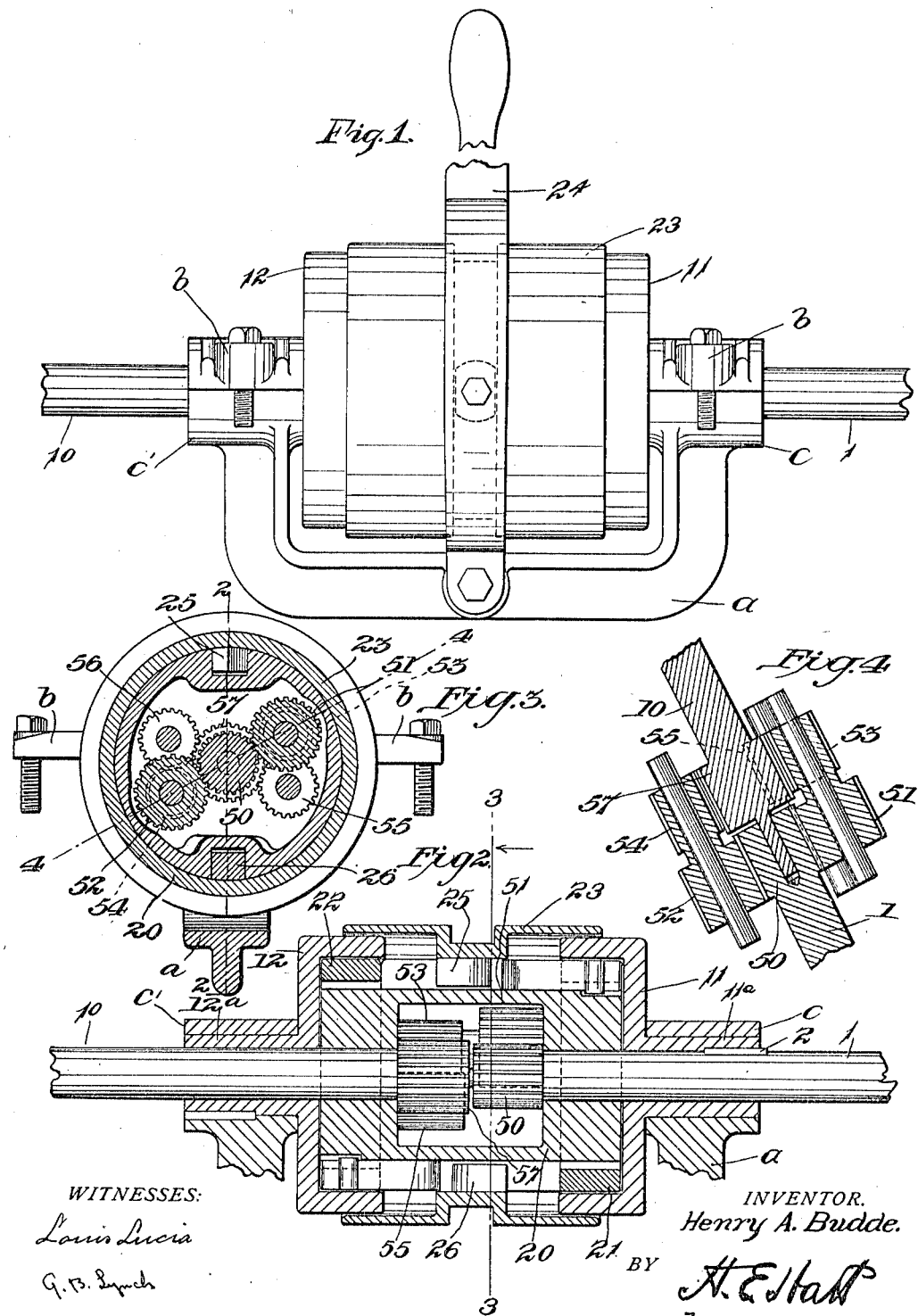

HENRY A. BUDDE, OF MANCHESTER, CONNECTICUT.

TRANSMISSION-GEARING.

1,001,615.   Specification of Letters Patent.   Patented Aug. 29, 1911.

Application filed December 21, 1910. Serial No. 598,561.

*To all whom it may concern:*

Be it known that I, HENRY A. BUDDE, a citizen of the United States, and a resident of Manchester, in the county of Hartford and State of Connecticut, have invented certain new and useful Improvements in Transmission-Gearing, of which the following is a specification.

The object of the invention is to produce a simple and effective transmission gearing for use in transmitting motion from a driving to a driven shaft either in the same or opposite directions.

The embodiment of the invention illustrated in the drawings is designed particularly for use as a transmission gear for power driven vehicles, such as boats, automobiles, etc.

Referring to the drawings—Figure 1 is a view of my transmission gear in side elevation. Fig. 2 is a central vertical section thereof. Fig. 3 is a transverse section on the line 3, 3, of Fig. 2. Fig. 4 is a longitudinal section on the line 4, 4, of Fig. 3.

Referring to the drawings $a$ denotes the frame in which the gearing is supported, this frame being provided with lateral projections $b$ at each end, by means of which it may be secured in place on suitable girders or blocks. The frame has bearings $c$, $c'$ at each end.

1 denotes the driving shaft which may receive its power direct from the motor, and 10 the driven shaft to which the propeller blades are secured.

11, 12 are friction cups having hubs $11^a$, $12^a$, located in the bearings $c$, $c'$ of the frame. The hub of the friction cup 11 is located free to turn in the bearing $c$. The hub of the friction cup 12 is located in the bearing $c'$ and keyed thereto. The driving shaft 1 passes through the hub of the friction cup 11 and is keyed thereto as at 2. The driven shaft 10 passes through and rotates in the hub $12^a$ of the friction cup 12.

The gearing is all contained in a gear case 20. Circling each end of this gear case are the expansible clutch rings 21, 22, which are adapted to be expanded into engagement with the friction cups 11, 12, respectively. A shifting sleeve 23 operated by the shifting lever 24 carries wedges 25, 26, by means of which the clutch rings 21, 22, are expanded.

The gearing system will be better understood by reference to Figs. 3 and 4 where it is more clearly illustrated.

50 denotes the gear on the driving shaft which meshes with the gears 51, 52, which are supported in suitable bearings in the casing. Fast on the shaft with the gears 51, 52, or formed integrally with them, are gears 53, 54, which are in mesh with gears 55, 56, also located in suitable bearings in the casing, these gears 55, 56, in turn meshing with the gear 57 on the driven shaft 10.

When the shifting sleeve is in its middle or neutral position as indicated in Figs. 1 and 2, both of the clutch rings are contracted so that the gear casing is quite disconnected from either one of the friction cups. The resistance which the water presents to the propeller blades prevents the driven shaft from rotating and in consequence the gear casing rotates with the driving shaft 1 but at about two-thirds of its speed. When the shifting sleeve is moved to forward position causing the clutch ring 21 to engage the friction cup 11 the gear casing is caused to travel at the same rate of speed as the driving shaft 1; all gears are thus locked and the driven shaft 10 rotates in the same direction and at the same speed of rotation as the driving shaft 1. If now the shifting sleeve is thrown to its rearward position engaging the clutch ring 22 with the friction cup 12 it will be seen that the casing 20 is prevented from rotation owing to the fact that the friction cup 12 is keyed in the bearing $c'$ of the frame $a$. In consequence the driven shaft 10 is rotated in an opposite direction and at about two-thirds the speed of the rotation of the driving shaft.

This structure provides a very simple and extremely efficient transmission gearing; one which is able to transmit a large amount of power in comparison to its size, and a gearing which runs very quietly either in forward or reverse speeds.

A simple embodiment of the invention is illustrated. I am aware that additions may be made to the structure and that it is susceptible to minor modifications without departing from the spirit of the invention.

I claim:—

A transmission gearing comprising a frame having alined bearings, a friction cup rotatably mounted in one of said bearings, and a second friction cup fixedly mounted in the other bearing, a gear casing located between said friction cups, clutch members at each end of said casing adapted for coöperation with said cups, a driving shaft passing through and keyed to said rotatable cup and extending into the interior of said casing, a driven shaft passing through and rotatable in said fixed cup and extending into the interior of said casing, gears secured to the abutting ends of said shafts, intermediate gears mounted in said casing and frame, forming a driving connection between the gears at the ends of said shafts, a shifting sleeve mounted exteriorly of the casing and overlying the ends of said friction cups and adapted for longitudinal movement, and means carried by said sleeve and adapted to operate said clutch members one at a time.

HENRY A. BUDDE.

Witnesses:
S. H. SIMON,
A. A. JOHNSON.

Copies of this patent may be obtained for five cents each, by addressing the "Commissioner of Patents Washington, D. C."